US006426757B1

(12) United States Patent
Smith et al.

(10) Patent No.: US 6,426,757 B1
(45) Date of Patent: Jul. 30, 2002

(54) METHOD AND APPARATUS FOR PROVIDING PSEUDO-3D RENDERING FOR VIRTUAL REALITY COMPUTER USER INTERFACES

(75) Inventors: Andrew J. Smith, Wellesbourne (GB); Leslie Robert Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 08/610,681

(22) Filed: Mar. 4, 1996

(51) Int. Cl.[7] .............................................. G06T 11/60
(52) U.S. Cl. ...................................... 345/634; 345/775
(58) Field of Search ................................ 395/119, 121, 395/122, 173, 135, 333, 334, 349, 351, 355; 345/419, 421, 422, 473, 435, 333, 334, 349, 351, 355, 629, 634, 757, 775, 850

(56) References Cited

U.S. PATENT DOCUMENTS

| | | | |
|---|---|---|---|
| 3,621,214 A | | 11/1971 | Romney et al. ............. 235/151 |
| 3,736,564 A | | 5/1973 | Watkins ................... 340/172.5 |
| 3,792,243 A | | 2/1974 | Appel et al. ................ 235/151 |
| 3,996,672 A | | 12/1976 | Osofsky et al. .............. 35/10.2 |
| 4,841,292 A | | 6/1989 | Zeno .......................... 340/736 |
| 4,970,666 A | | 11/1990 | Welsh et al. ................. 364/522 |
| 5,015,188 A | | 5/1991 | Pellosie, Jr. et al. .......... 434/38 |
| 5,130,794 A | | 7/1992 | Ritchey ........................ 358/87 |
| 5,179,656 A | * | 1/1993 | Lisle ........................... 395/355 |
| 5,255,352 A | | 10/1993 | Falk ............................ 395/125 |
| 5,276,785 A | | 1/1994 | Mackinlay et al. ......... 395/127 |
| 5,287,437 A | * | 2/1994 | Deering .................. 395/119 X |
| 5,295,234 A | * | 3/1994 | Ishida et al. ................. 395/121 |
| 5,325,472 A | | 6/1994 | Horiuchi et al. ............. 395/127 |
| 5,339,390 A | | 8/1994 | Robertson et al. ........... 395/157 |
| 5,347,628 A | * | 9/1994 | Brewer et al. ............... 395/351 |
| 5,367,614 A | * | 11/1994 | Bisey .......................... 395/119 |
| 5,381,158 A | * | 1/1995 | Takahara et al. ........ 395/355 X |
| 5,381,526 A | | 1/1995 | Ellson ......................... 395/164 |
| 5,432,895 A | | 7/1995 | Myers ......................... 395/119 |
| 5,442,733 A | | 8/1995 | Kaufman et al. ............ 395/124 |
| 5,452,414 A | * | 9/1995 | Rosendahl et al. .......... 395/355 |
| 5,621,906 A | * | 4/1997 | O'Neill et al. ............... 395/355 |
| 5,696,892 A | * | 12/1997 | Redmann et al. ........... 345/425 |

FOREIGN PATENT DOCUMENTS

| | | |
|---|---|---|
| JP | 7059945 A | 3/1995 |
| JP | 407254072 | * 10/1995 |
| WO | WO 95/04331 | 2/1995 |

* cited by examiner

*Primary Examiner*—Mark Zimmerman
(74) *Attorney, Agent, or Firm*—Jeffrey S. LaBaw; Bracewell & Patterson, L.L.P.

(57) ABSTRACT

A computer system which includes a central processing unit, a bus, and a memory store coupled to the central processing unit that includes a psuedo 3D rendering mechanism. Typically, the rendering mechanism is loaded in the memory store, but can be implemented in an application's specific integrated circuit further coupled to the central processing unit via the bus. The psuedo 3D rendering mechanism is used to generate a psuedo 3D rendered virtual image using only two dimensional prerendered selected views of 3D objects to be displayed. As the viewing orientation shifts from point to point, an adequate three-dimensional rendering is provided based on these selected views. These selected views are designed for display on a display device further connected to the computer system.

13 Claims, 4 Drawing Sheets

METHOD AND APPARATUS FOR PROVIDING PSEUDO-3D RENDERING FOR VIRTUAL REALITY COMPUTER USER INTERFACES

BACKGROUND OF THE INVENTION

1. Technical Field

The present invention relates generally to a data-processing system utilizing three-dimensional rendering and, more particularly, to a data-processing system using rendered two-dimensional images for generating pseudo-three-dimensional views. More particularly still, the present invention is directed towards utilizing selected prerendered views of objects in a manner sufficient to provide adequate viewability as well as providing image scaling to provide correct depth perception of the prerendered three-dimensional views.

2. Description of the Related Art

Computer systems are well known to those skilled in the art. In fact, computers have become quite common in both the business world and at home. Computers are used because of their ability to perform complex tasks quickly and efficiently. The computers programs, or software, which include the user interfaces, have advanced from character-based user interfaces to graphical-oriented user interfaces, also known as graphical user interfaces (GUI).

These GUIs have advanced to resemble a three-dimensional "place" or virtual world that includes rooms or scenes to provide a more easily understood or familiar metaphor for organizing visual representations of objects within the computer. While the notion of using a 3D virtual world is helpful for some users, generalized user interfaces using virtual world techniques are usually based on 3D drawings of the environment and all the objects it contains. While the use of 3D drawings can be used on sufficiently equipped systems that have powerful microprocessors or add-on devices to process the complex 3D images, this computational overhead on the most popular personal computers (PC) systems are wanting in the ability to render 3D drawings on the fly in their full complexity.

When creating a "place user interface" (Place UI), the virtual world can be built using prerendered views of the world. Objects contained in the computer can then be added. Unfortunately, when a 2D image is created for an object, it assumes a fixed viewing angle and size. While an object may be correctly drawn so that it appears correct in one place, moving the object to a different location in a 3D world results in visual discontinuity and breaks the "place" paradigm. Therefore, it would be useful to have a simpler computational model that uses prerendered objects to build good-performing generalized virtual world user interfaces on currently available 2D-based personal computers.

One solution to generating a Place UI is to pretender all the possible 3D views ahead of time and display the resulting 2D images based on where the user places the viewing point. This technique provides a nice-performing Place UI since it only uses 2D versions of the prerendered images and it has greater prefixed, predefined viewpoints. Unfortunately, the world itself is static in this implementation and needs more interactive characteristics by adding visual representations of objects contained in the computer. The combination of prerendered images of the world, a grid of fixed viewing points within the world, and the visual representations of live objects contained in the world constitute a pseudo-3D world for building a Place UI. Unfortunately, adding objects anywhere in the virtual world requires the object to be drawn in the proper viewing angle. This is a problem for 2D-based systems because of all of the possible viewing angles and surfaces upon which objects may be attached or laid.

The use of the grid will now be described and illustrated in FIG. 1. To provide effective movement in a Place Ul, the virtual space is overlaid with a finite set of points at which a user may be positioned as illustrated in the schematic diagram of FIG. 1. This set of discreet navigation points defines the grid of possible points from which the background images and objects it contains may be viewed. This grid 10 of viewing points is defined by a cartesian coordinate and heading within the 3D space of the place. Together, the cartesian coordinate and heading provide the location and direction from which the user is currently viewing the place. Within the diagram of FIG. 1, the dash lines represent grid lines while the dashed circles represent viewing circles.

When the user is at a point on the grid such that either point A, B, or C, or where any of the viewing circles exist, the prerendered view of the background is displayed. As the user turns left or right, the image is that defined for the next available heading defined for that point in the grid. Turning can be constrained to orthogonal views but is not necessary. Further, turning can be done by rotating about the viewpoint or by traversing points around the viewing circle. Either turning technique may be implemented.

Once a position and heading into 3D virtual space have been selected, the Place Ul allows interaction with objects in the space. When an object is added to a space, it is desirable for that object to be displayed in the proper perspective for the environment, which means the viewing angle such as the point and heading of the user. Thus, if a wall clock is placed on the wall at point 3 in FIG. 1, it will appear in the familiar front or orthogonal view for user C's view; however, if it is placed at points 1 or 2, a different view is required for location A or C. Furthermore, the 3D space and grid techniques cannot guarantee a fixed number of viewing angles.

SUMMARY OF THE INVENTION

It is therefore one object of the present invention to provide a data-processing system utilizing three-dimensional rendering.

It is another object of the present invention to provide a data-processing system using rendered two-dimensional images for generating pseudo-three-dimensional views.

More particularly still, it is yet another object of the present invention to provide direction towards utilizing selected prerendered views of objects in a manner sufficient to provide adequate viewability as well as providing image scaling to provide correct depth perception of the prerendered three-dimensional views.

According to the present invention, a computer system is disclosed, which typically includes a central processing unit, a bus, and a memory store, coupled to the central processing unit, that includes a psuedo 3D rendering mechanism. Typically, the rendering mechanism is loaded in the memory store, but can be implemented in an application specific integrated circuit further coupled to the central processing unit via the bus. The psuedo 3D rendering mechanism is used to generate a psuedo 3D rendered virtual image using only two dimensional prerendered selected views of 3D objects to be displayed. Further, as the viewing orientation shifts from point to point, an adequate three-dimensional rendering is provided based on these selected views.

These selected views are designed for display on a display device further connected to the computer system. Initially, the rendering mechanism generates a grid of virtual space overlaying a finite set of points at which the user may be positioned. This virtual space is a three-dimensional world much like a virtual reality. The grid of viewing points is defined by cartesian coordinate and a heading within that virtual space.

The rendering mechanism pretenders a selected number of views of each object to be viewed based on a set of rules that provide "good enough" imaging. In the virtual world, a place user interface (Ul) generating mechanism is also coupled to the Psuedo 3D rendering mechanism, which may be implemented via software and stored within the memory store, or implemented in an application specific integrated circuit, and then generates a place Ul for display in which the psuedo rendering is also displayed. The rendering mechanism can also scale the image of a selected object based on the view of that particular object. Also, within the virtual space, each object placed therein is orientated with an object heading direction relative to the grid heading to define each object's orientation view.

A computer program product is also provided for based upon the implementable software aspects of the rendering mechanism. Likewise, a method of displaying 3D virtual images on a display device is also disclosed. The basic steps of the method include building a place user interface for display, defining a group of objects for display in that place Ul, generating a selected number of prerendered views for each group of objects for display, storing the selected number of prerendered views, establishing surface maps within the place Ul, and then utilizing the surface maps to select a desired one of the stored selected number of prerendered views of each object to be illustrated. When the method implements the generating of selected number of prerendered views, a particular set of "good enough" rules is used in selecting the prerendered views. An additional step may include performing image scaling of any of the desired prerendered views to be illustrated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
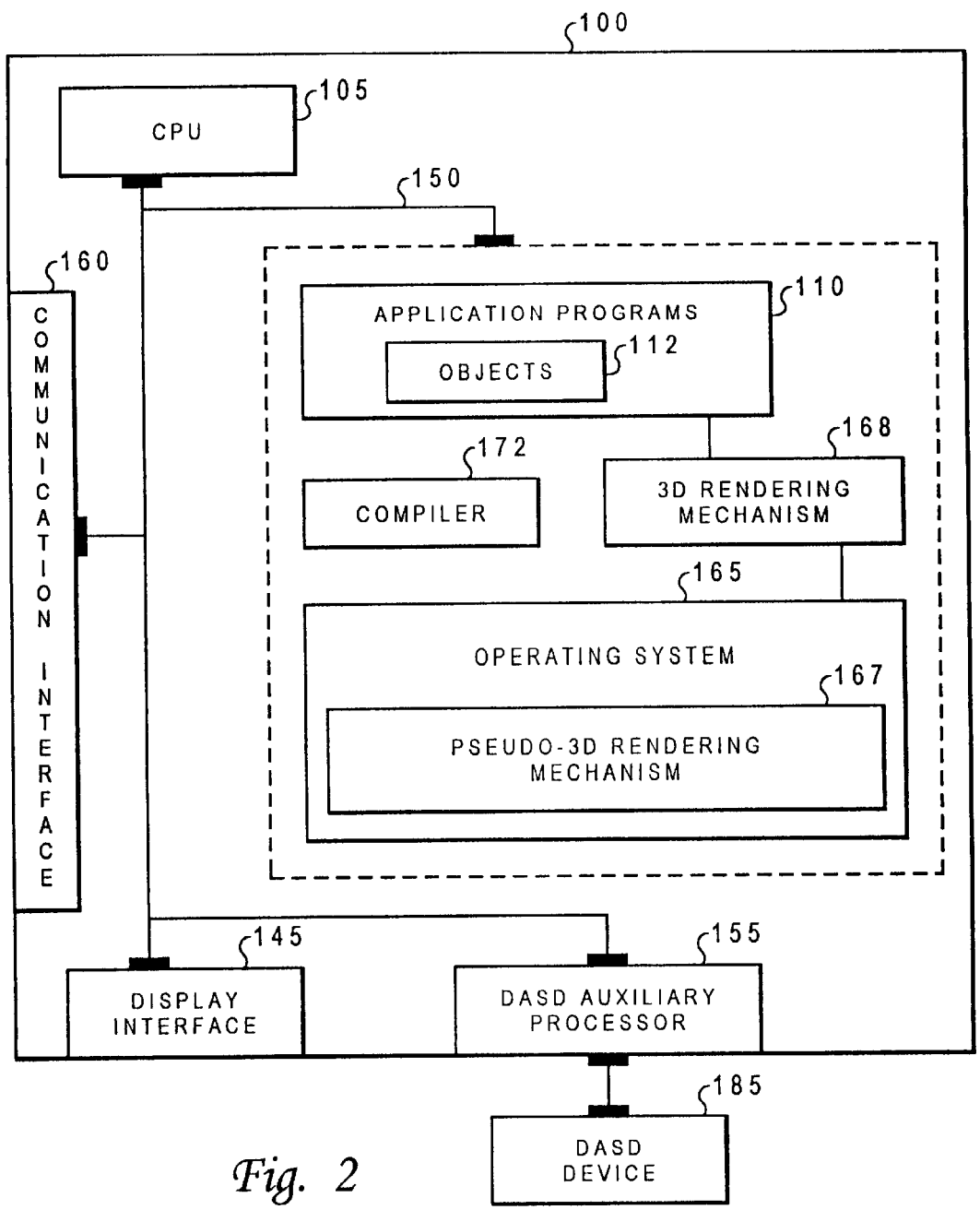
FIG. 2 depicts a block diagram of the computer system according to the present invention.

FIG. 2 shows a block diagram of the computer system of the present invention. The computer system of the preferred embodiment is an enhanced IBM Aptiva personal computer system. Those skilled in the art, however, will appreciate that the mechanisms and apparatus of the present invention apply equally to any computer system, regardless of whether the computer system is a complicated multiuser computing apparatus or a single-user workstation. As shown in the exploded view of FIG. 2, computer system 100 comprises main or central processing unit (CPU) 105 connected to main memory 140, terminal interface 145, mass storage interface 155, and network interface 160. These system components are interconnected through this use of system bus 150. Although computer system 100 is shown to contain only a single main CPU and a single system bus, it should be understood that the present invention applies equally to computer systems that have multiple CPUs and to computer systems that have multiple busses and that each perform different functions in different ways.

The interfaces, also known as input/output processors, that are used in the preferred embodiment each include separate, fully programmed microprocessors that are used to offload computer-intensive processing from CPU 105. Those skilled in the art, however, will appreciate that the present invention applies equally to computer systems that simply use IO adapters to perform similar functions. Terminal interface 145 is used to connect directly one or more terminals to computer system 100. These terminals, which may be nonintelligent or fully programmable workstations, are used to allow system administrators and computer programs to communicate with computer system 100. Network interface 160 is used to connect other computer systems or workstations, or both, to computer system 100 in network fashion. The present invention is not limited to any one networking mechanism. Computer system 100 may be connected to other systems through the use of present-day analog or digital techniques, or both, or via some networking mechanism of the future.

Mass storage interface 155 is used to connect mass storage devices, such as DASD device 185, to computer system 100.

Main memory 140 contains application programs 110, compiler 172 and operating system 165. While application programs 110 and operating system 165 are shown to reside in main memory 140, those skilled in the art will recognize that these entities are shown in this manner to represent the fact that programs are typically loaded from slower mass storage into faster main memory to execute. Depicting these programs in this manner should not be taken to mean that they are necessarily all completely contained in main memory 140 at the same time. It should also be noted that the term computer system memory is used herein to refer generically to the memory of the computer system as a whole (i.e., main memory 140 and that represented by DASD device 185). Those skilled in the art will further recognize that the programs shown in main memory 140 need not necessarily all reside on computer system 100. For example, one or more programs of application programs 110 may reside on another system and engage in cooperative processing, with one or more programs that reside on computer system 100. This should be accomplished through the use of one of the well-known client-server mechanisms such as remote procedure call (RPC).

Compiler 172 is used to compile source code into executable code, as will be explained in the forthcoming paragraphs. Operating system 165 is a multitasking operating system known in the industry as OS2 operating system; however, those skilled in the art will appreciate that the spirit and scope of the present invention is not limited to any one operating system.

It is important that while the present invention has been, and will continue to be, described in a context of a fully functional computer system, those skilled in the art will appreciate that the present invention is capable of being distributed as a program product via floppy disk, CD ROM, or other form of recordable media or via any type of electronic transmission mechanism, such as a modem.

Further provided in the operating system is a pseudo-3D rendering mechanism 167 that implements a realistic 3D virtual world user interface or "Place Ul" in such a way that it only uses computationally simple two-dimensional drawing techniques. The two-dimensional images are rendered from actual three-dimensional images generated by 3-D rendering mechanism 168, which is part of rendering mechanism 167. Rendering mechanism 167 achieves this by first utilizing visual and navigational restrictions that are available in a Place Ul that naturally limit the way objects are viewed. Secondly, the rendering mechanism 167 also utilizes a lower tolerance for visual accuracy commensurate with the user value placed on objects in a Place Ul. Further, the rendering mechanism 167 relies on simplified surface map scans that are pregenerated for each scene to indicate the required perspective for objects placed in each region of the "place." By implementing these techniques, rendering mechanism 167 permits all graphics to be prerendered as 2D images from a small number of views. Thus, when an object is placed in the static prerender world, the "best fit" view of the object can be used to provide a visual integrity that is "good enough." In generating a pseudo-3D virtual reality, the rendering mechanism 167 implements the steps depicted in the flowchart of FIG. 3.

Figures 3, 5:
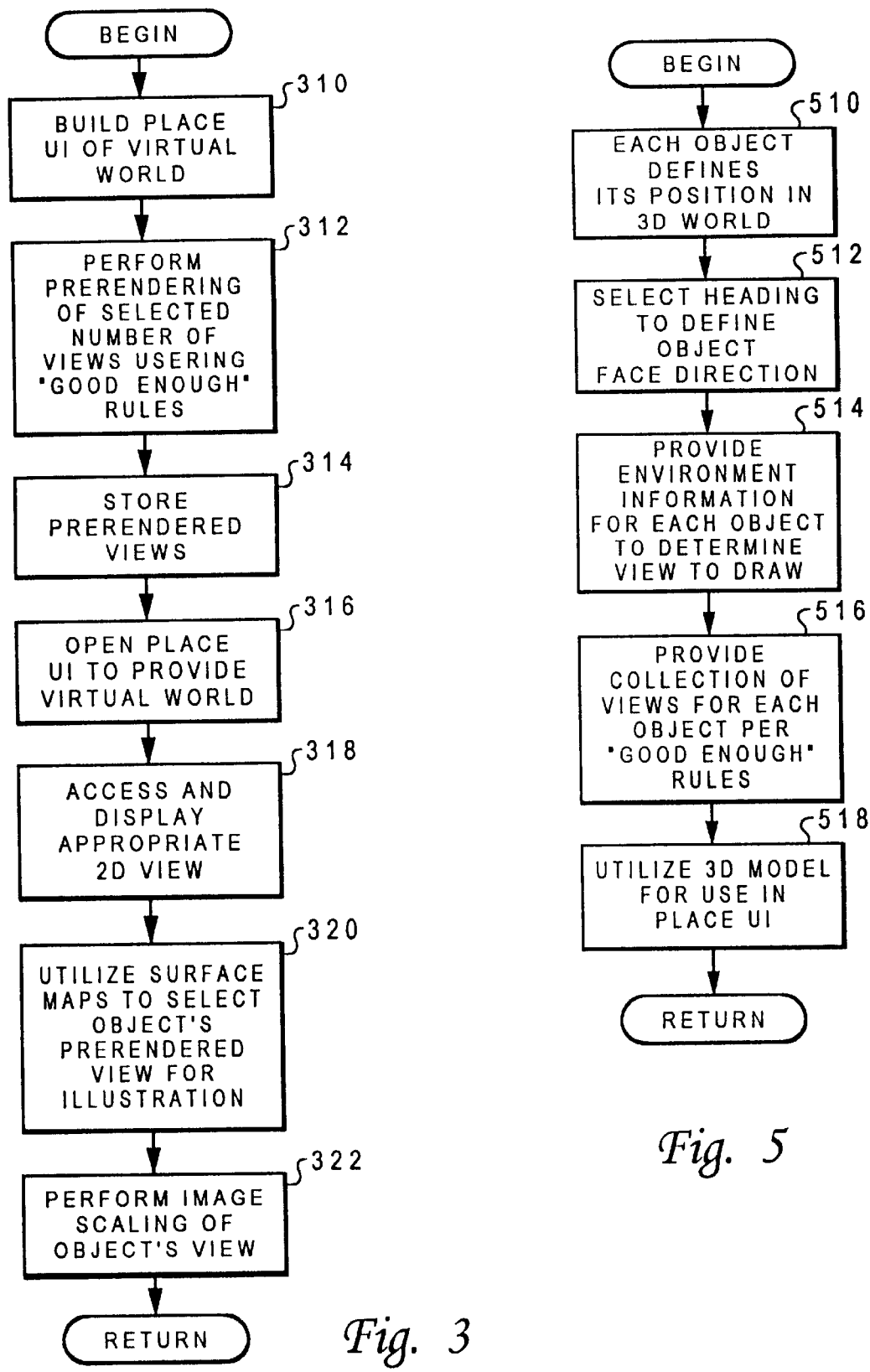
FIG. 3 depicts a block diagram of the method implemented by a rendering mechanism to generate a pseudo-3D virtual reality computer user interface.
FIG. 5 depicts a flow diagram that illustrates how an object placed in the "virtual world" of the present invention, stores its position, heading and surface data for use in redrawing itself.

FIG. 3 illustrates a block diagram of the method implemented by rendering mechanism 167 to generate a pseudo-3D virtual reality computer user interface or "Place Ul." In block 310, a grid-oriented Place UI is built from static 3-dimensional prerendered views of the virtual world from all possible views available to the user. In block 312, a prerendering of a small number of views of an object is performed based on "good enough" rules, which are described in greater detail below. After, the 2-dimensional prerendered views are generated by 3-D rendering mechanism 168, they are then stored in DASD 185 (block 314). After this point, the Place Ul is installed on the system and the user then enters the virtual world (block 316). In block 318, rendering mechanism 167 accesses and displays the appropriate 2-D view from DASD 185 and then performs steps 320–322 for any additional object in the scene that was not in the original view previously generated and stored on DASD 185.

In block 320, surface maps are utilized to select an object's prerendered view for illustration. Lastly, in block 322, a simple 2D image scaling of an object's view is performed to provide correct depth perception from viewpoints farthest away from the object than its original prerendered view. Each of these steps are described in greater detail below.

Figure 1:
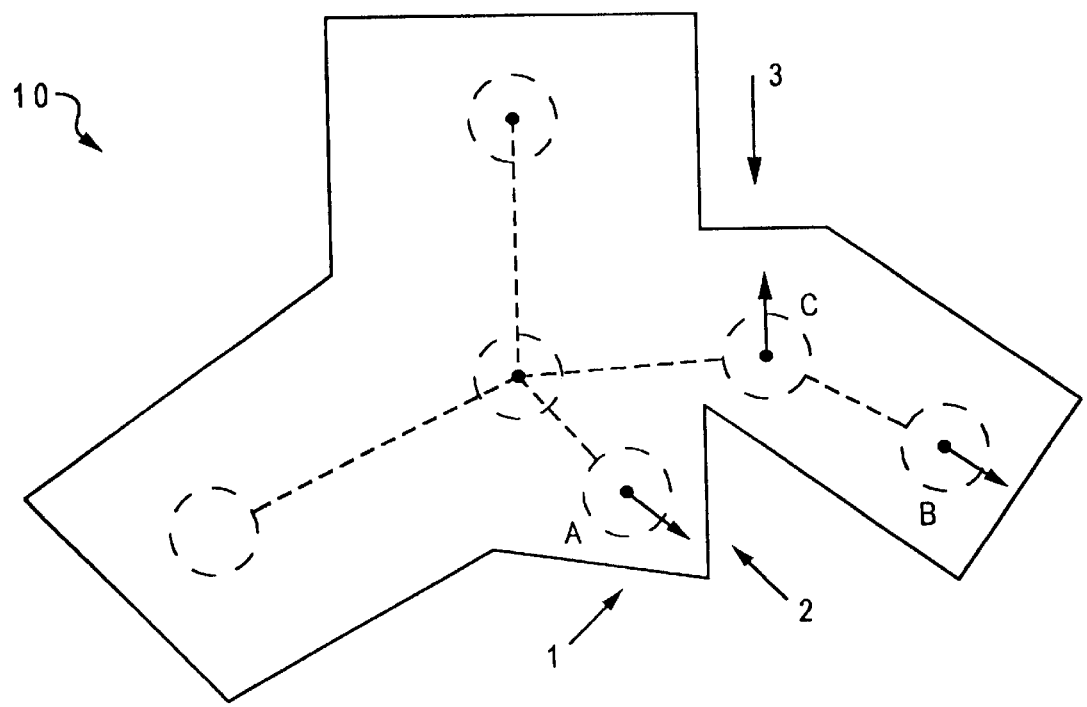
FIG. 1 is an illustration of a schematic diagram that describes the use of a grid of fixed viewing points within the prior art.

The Place Ul grid is the same as that described in the background of the invention with relation to FIG. 1, except with the addition of steps 312–322 that result in a much improved and simplified 3D rendering implementation. Further within the grid, every important surface in a scene upon which an object may be put is predefined so that it is easily accessible when the scene is generated. Also, the grid controls the nearest point from which an object will be viewed in 3D. Further, the grid, scene, and view headings limit the number of views from which a moveable object may be viewed.

Figure 4:
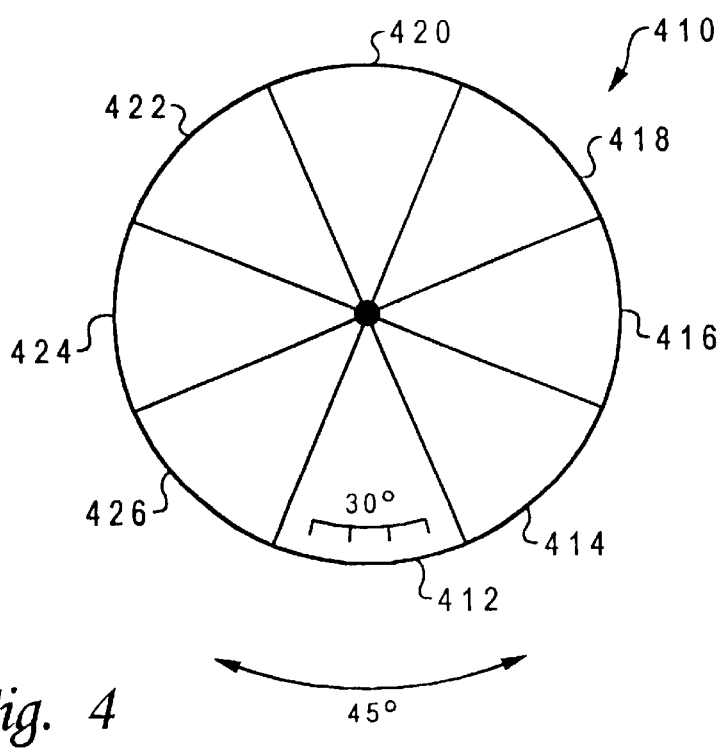
FIG. 4 is an illustration of a viewing circle according to the rules of "good enough"

To achieve visual accuracy according to block 312 of FIG. 3, a viewing circle that is "good enough" is established as depicted in FIG. 4. Within the grid established previously, several visual phenomenon occur that allow compromises to be made so that only a small number of views are required for a moveable object to appear visually correct in a 3D virtual world. The visual phenomenon heretofore defined as "good enough" rules for providing interactive pseudo-3D virtual worlds will now be explained.

In a real 3D environment, viewing an object along a surrounding circle will result in a new view of the object every so many degrees of the view angle change. In a 2D drawing system, each object would have to have a prerendered image for each point along the circle. Because of the way a computer creates a 3D appearance on a flat screen, the mind attempts to reconcile the seemingly conflicting images based on the real world to which it is accustomed. For the purposes of a Place Ul, this human reconciling with the image is enough to permit it to compromise the degree of visual integrity between the background and the moveable object. Thus, "good enough". rules only require that the viewing angle be sufficiently close enough to make the mind do the rest. A viewing error of 30 degrees left or right is "good enough." That is, if an object is viewed by travelling in a circle around it as shown in FIG. 4, "good enough" rules say that a new view of the object need only occur every 45 degrees. Further, over the course of 45 degrees, the casual observer may really only notice the view error outside a 30-degree arc centered in front of the object. Thus, at any given point along the 45-degree view, the visual integrity is in error only in the 7.5-degree arcs at the extreme ends.

In FIG. 4, the "good enough" view in circle 410 defines a maximum of eight views 412–426 for which an object must be prerendered. Many objects, however, are symmetrical in their left-to-right, side-to-side, or front-to-back views. Those objects with angles of symmetry in any of the viewing angles do not require all the views to be prerendered. Symmetrical views can be generated dynamically using simple 2D image-processing techniques. For example, objects that appear the same from position 2 as position 8 need not have the view from position 8 generated, and so on. Therefore, the worst case requires eight views of an object. The best case, however, is where an object looks the same from the front as the side. In this best-case example, only views 1 and 2 are required.

In the vertical dimension, 45 degrees of view in the wide dimension are similarly "good enough" and need not change. Given the constant viewing height from the floor that is typical in Place Ul environments, the 45 degrees of vertical view cover 80% of the viewable area in the wide dimension. Objects placed in the remaining 20%, however, can be faked by using 2D image transformations to shrink or expand an image enough to trick the eye. This is depicted in the diagram illustrated in FIG. 4, which depicts the "good enough" views in the vertical dimension. Accordingly, object views for the viewing height within the Place Ul environment are limited to a single vertical-viewing angle.

Next, the invention must provide views of objects from other points in the Place Ul. This is achieved by first assuming a correct perspective of an object from one point in the grid. From this point in the grid, it is then possible for an object to be visible from another point on the grid. As such, this view will change from different points on the grid. In order to provide the proper perspective as the view changes, the rendering mechanism 167 first prepares object definitions and then establishes surface maps. These are described in greater detail below.

To handle the correct drawing of an object in a Place Ul, each object must be defined with enough information about the object and its environment. At a minimum, each object includes the following as represented in the flow diagram of FIG. 5. In block 510, each object defines its position in the 3D world. Next, in block 512, a fixed heading in the 3D world is selected that defines the direction that the object faces. In block 514, the object is provided information about its environment from which it can determine the proper view of itself to draw. Namely, the current grid position is provided where the user is positioned, the heading of the user, and the surface plane in the current view upon which the object is placed. In block 516, a collection of views for the object is provided that includes each view in the circle of "good enough" rules previously described. Of course, not all possible views must be defined if the view can be drawn by simply flipping another view when the object is drawn, which accounts for symmetry or asymmetry. In block 518, an optional 3D mathematical model for use in Place Ul implementations that have 3D rendering ability may be provided.

With this information, when an object is placed in the 3D world, its position and heading are determined and stored as part of the object. Furthermore, the virtual surface upon which an object is placed, such as a wall, desk, shelf, etc., is also known. Therefore, when an object is placed in the virtual world, it stores its position, heading, and surface data. Then, whenever the object has to draw itself, it can determine its proper view by comparing its position, heading, surface data with the user's viewing position and heading.

Figure 6:
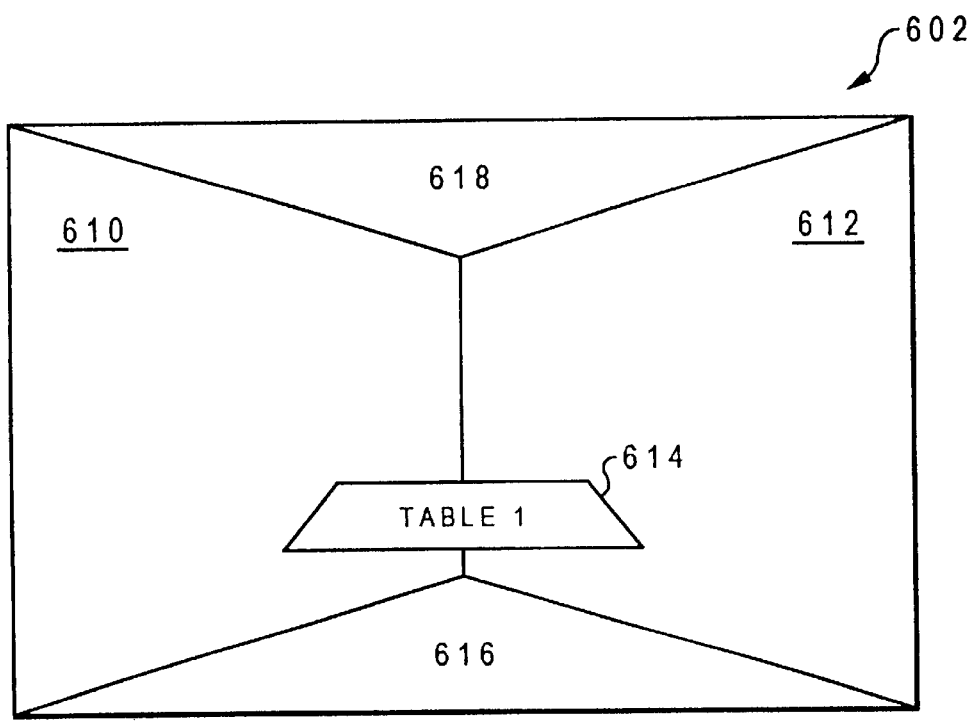
FIG. 6 depicts an illustration of a surface map that provides the information required in determining the angle of the surface upon which an object is being placed.

Lastly, surface maps are generated that are used to provide necessary information required to determine the angle of the surface upon which the object is being placed. An example of a surface map is depicted in FIG. 6. Since the virtual world consists of prerendered images, each image includes information about the surfaces it contains. For example, the place shown at point A in FIG. 1 is that of a corner made from two walls 610 and 612 that join at roughly 40 degrees. After adding a table object 614 to this part of the room 602, the surface map for this view would look like the drawing in FIG. 4. In FIG. 4, each surface is defined by a polygon and a number corresponding to the view angle from the "circle of good enough." When placed into this view, an object draws itself in the correct perspective by determining which polygon contains its own position point. Adding new objects to a Place Ul in FIG. 4 that in and of themselves create new surfaces not present when the Place Ul environment was initially generated, is handled by generating a composite surface map by taking the union of the collective surfaces.

Thus, it has been shown and described of a novel pseudo-3D-rendering mechanism for generating virtual reality computer-user interfaces. The rendering mechanism achieves the pseudo-3D-imaging by using prerendered images of the virtual world from fixed point of view. Also, the rendering mechanism allows objects to be added to the environment and moved about without a 3D drawing engine without breaking the perception of a 3D virtual world. This is achieved by using a low number of views generated by the object creators to satisfy rules good enough. This then provides a quick 2D surface map for use by objects in selecting which view of themselves to draw.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   a central processing unit;
   a bus;
   a memory store coupled to said central processing unit via said bus;
   a pseudo 3D-rendering mechanism, loaded within said memory store, that generates a pseudo-3D-rendered virtual image for display on a display device using only two-dimensional prerendered views of 3D objects to be displayed, wherein as a viewing orientation of a user within said virtual image shifts from a first viewing point to a second viewing point of said user within said virtual image, an approximately visually accurate three-dimensional rendering of said pseudo 3D-rendered image is provided utilizing selected ones of said prerendered views.

2. The computer system according to claim 1 wherein said rendering mechanism generates a grid of virtual space overlaying a finite set of points at which a user may be positioned within said virtual image, said grid of viewing points being defined by a cartesian coordinate and a heading within said virtual space, said cartesian coordinate defining said position of said user, and said heading defining a direction said user is facing within said virtual image.

3. The computer system of claim 2 wherein each object placed within said virtual space is oriented with an object heading direction relative to said grid heading to define each object's orientation view.

4. The computer system of claim 1 wherein said rendering mechanism prerenders a selected number of views of each object to be viewed based on a set of rules that provide "good enough" imaging.

5. The computer system of claim 1 further comprising:
   a place user interface (Ul) generating mechanism, coupled to said pseudo 3D rendering mechanism, that generates a place Ul for display in which said pseudo rendering is also displayed.

6. The computer system of claim 1 wherein said pseudo 3D rendering mechanism scales an image of a selected object based on the view of said selected object.

7. A method of displaying a virtual 3D image on a display device, comprising:
   building a place user interface (Ul) for display, wherein said place Ul defines a 3D world;
   defining a group of objects for display in said place Ul;
   for each of said group of objects, generating a selected number of prerendered views;
   storing said selected number of prerendered views of each object;
   determining a viewing point of a user within said place Ul, said viewing point being associated with a physical location of said user within said place Ul and a heading direction of said user;
   establishing surface maps within said place Ul; and
   utilizing said surface maps and said viewing point to select a desired one of said stored selected number of prerendered views of each object to be illustrated.

8. The method according to claim 7 wherein said step of generating a selected number of prerendered views utilizes "good enough" rules in selecting said prerendered views.

9. The method according to claim 7 further comprising the step of:

performing image scaling of one of said desired prerendered views to be illustrated.

10. The method according to claim 7 wherein said step of generating a selected number of prerendered views further comprises:

selecting a heading within said place Ul to define each face direction for each of said selected objects;

defining environment information within said place Ul for each of said selected objects to determine an appropriate view to draw for each of said selected objects.

11. The method according to claim 10 wherein said environment information allows some, but not all, of said selected objects to be illustrated.

12. The method according to claim 7, wherein each of said group of objects is associated with environment information, for each of said group of objects said environment information including a position of said each of said group of objects in said place Ul, a heading direction of said each of said group of objects which defines a direction said each of said group of objects is facing, and a surface on which said each of said group of objects is placed.

13. The method according to claim 12 wherein said step of utilizing said surface maps and said viewing point to select a desired one of said stored selected number of prerendered views of each object to be illustrated further comprises the step of for each of said group of objects, comparing said environment information with said viewing point which includes said physical location and said heading of said user to select said desired one of said stored prerendered views.

* * * * *